Nov. 5, 1929.  A. N. PARRAN  1,734,045
DISPENSING APPARATUS
Filed Nov. 22, 1928      5 Sheets-Sheet 3
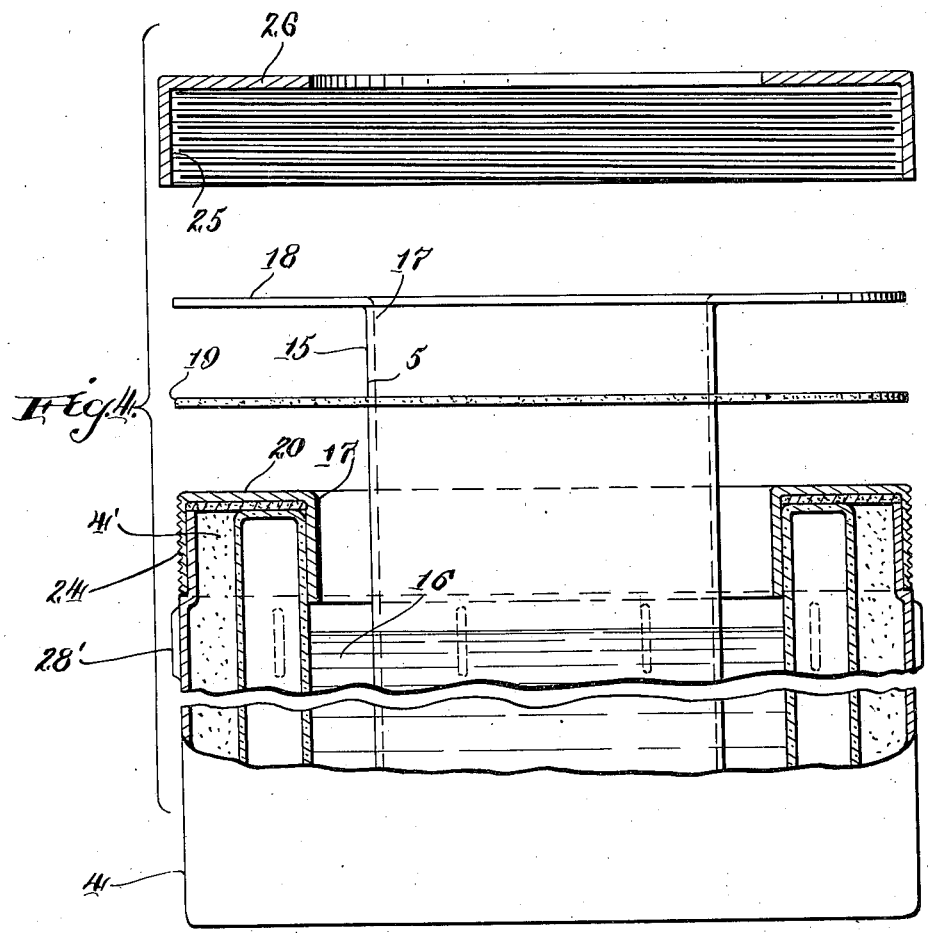
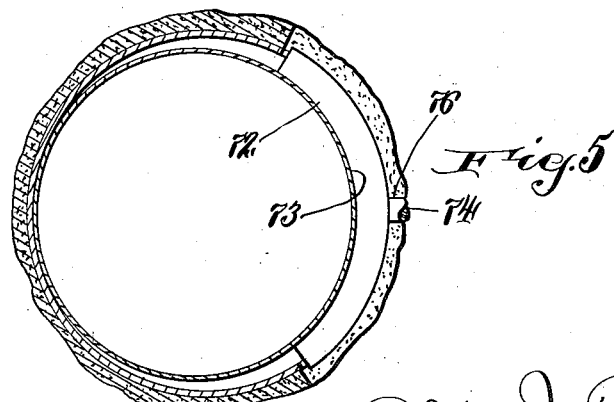

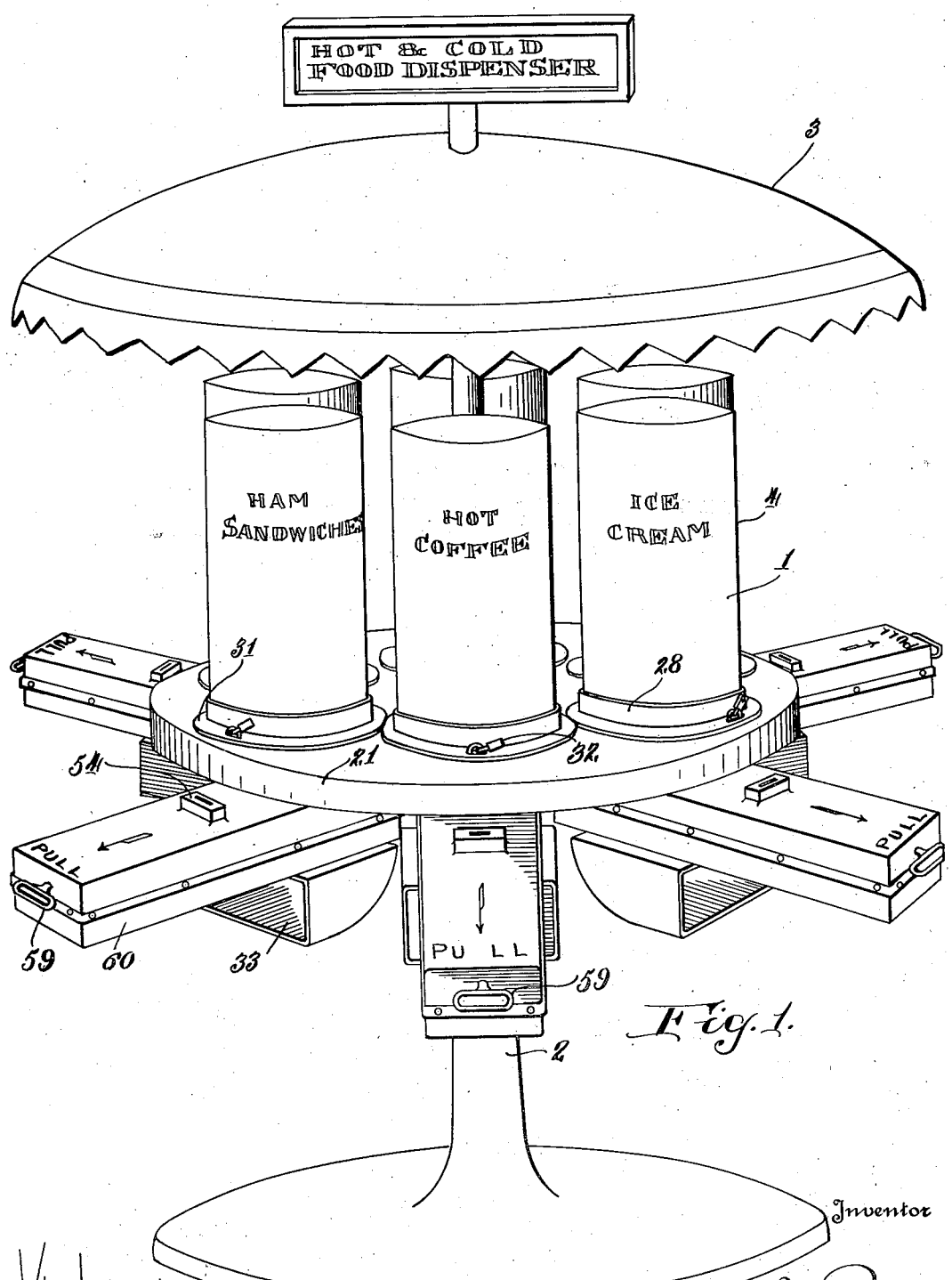

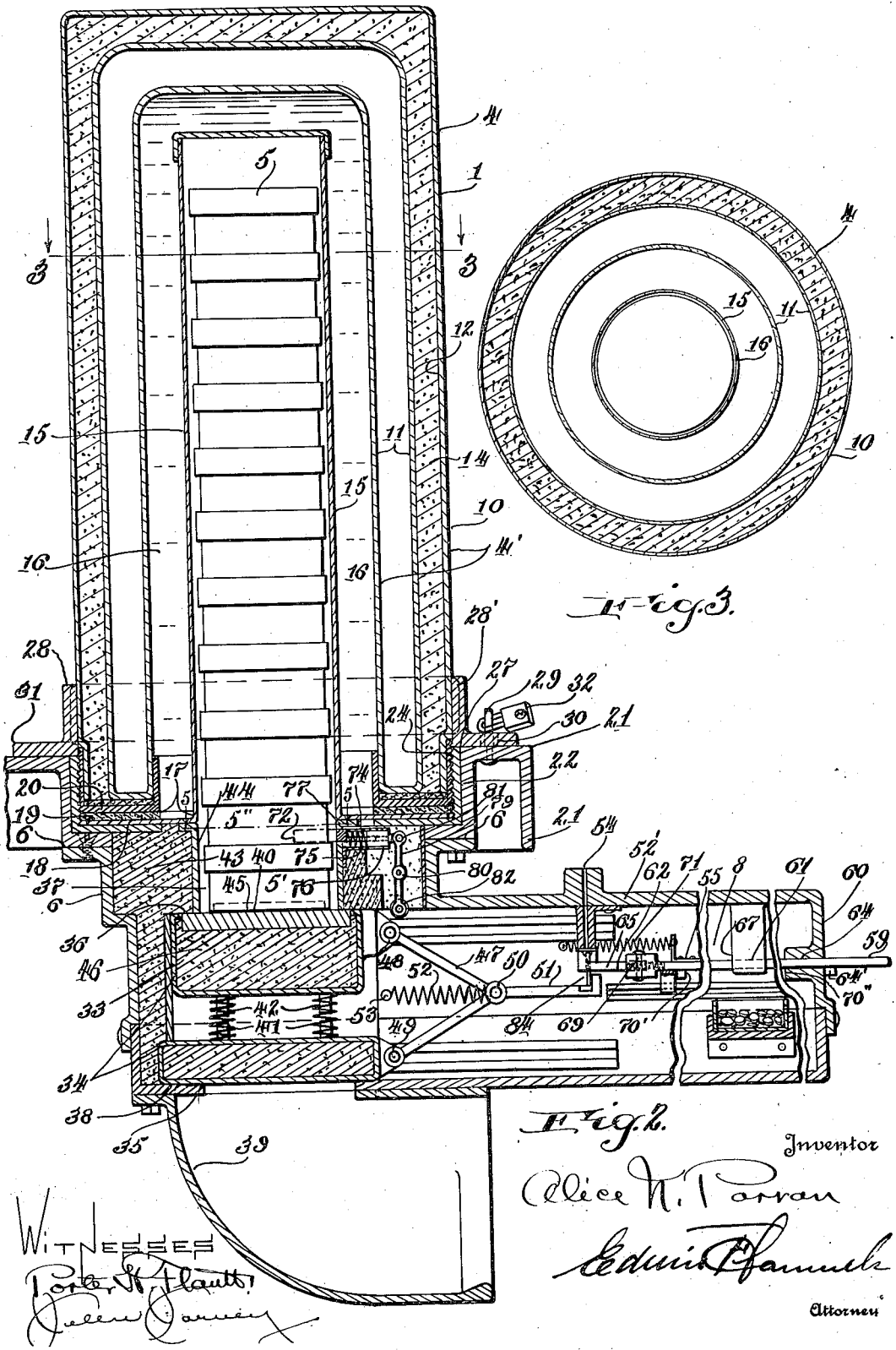

Nov. 5, 1929.  A. N. PARRAN  1,734,045

DISPENSING APPARATUS

Filed Nov. 22, 1928    5 Sheets-Sheet 4

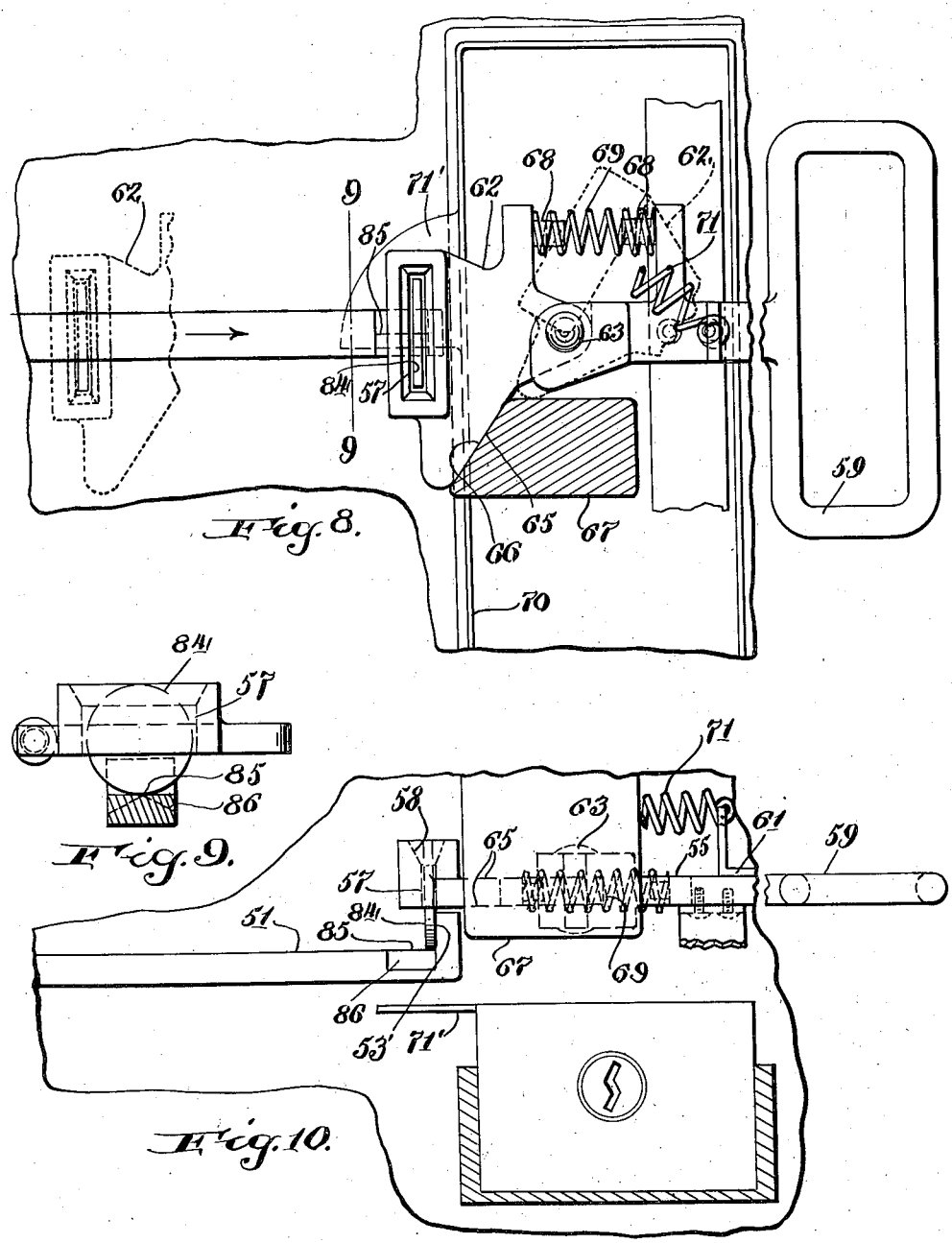

Patented Nov. 5, 1929

1,734,045

UNITED STATES PATENT OFFICE

ALICE N. PARRAN, OF BALTIMORE, MARYLAND

DISPENSING APPARATUS

Application filed November 22, 1928. Serial No. 321,047.

While coin controlled and other automatic dispensing apparatus used has been applied to the sale of almost every commodity which is in general demand and capable of being distributed in small packages which are not extremely perishable, the application of strictly automatic dispensing apparatus to hot or cold food packages has not as yet it is believed been successfully accomplished.
The employment of partly automatic dispensing apparatus in the sale of hot and cold foods is quite generally practiced, but in every instance an attendant performs a large part of the dispensing operation, the dropping of the coin serving as a signal or notice that an order of a certain nature is to be served which order may in some instances be placed on an automatic carrier and delivered to the customer.
There is, however, believed to be an important demand for a strictly automatic dispensing apparatus for handling packages of food including perishable foods which are held in the apparatus and maintained at a temperature many degrees above atmospheric temperature as in the serving of hot meats with vegetables or as sandwiches or below atmospheric temperature as in the sale of ice cream and beverages for periods of several hours comprising the period required to sell a number of packages which can be handled economically in this way.

This type of dispensing apparatus while it is particularly adapted to meet the demands of the motor touring public, so that such an apparatus would constitute an important feature of a gasoline dispensing station, it is capable of general application for use in railroad stations and in almost every location where coin controlled dispensing apparatus handling candy, chocolate, chewing gum, or other commodities is operated on a profitable basis.

The present apparatus comprises in place of the outer casing of the usual coin controlled apparatus an insulated casing within which is a chamber or receptacle for heating or cooling fluid or other heating or cooling medium which serves as a reservoir to compensate for any loss of temperature from the receptacle to the outside air and if preferred to give the commodity the desired initial temperature, the heating or cooling medium being most conveniently arranged and maintained in the form of a jacket almost completely enclosing an inner receptacle for the packages of hot or cold food to be preserved and dispensed.

In the form of the invention shown the apparatus includes a stand supporting a number of receptacles to which stand the receptacles are locked, so that they may be removed, and if necessary, inverted for loading with a new supply of food packages, and particularly for the removal and replenishing of the heating or cooling fluid which as already pointed out acts as a reservoir for heat or cold to maintain the desired temperature and supply any losses to the outside air.

In addition to the apparatus thus outlined, the invention includes a food dispensing package adapted for distribution in this way, and a coin controlled means for releasing the packages one at a time from the apparatus.

In the accompanying drawings I have illustrated a dispensing apparatus for hot or cold food packages embodying the features of my invention in the preferred form.

In the drawings:

Figure 1 is an elevation of a dispensing stand supporting a plurality of units of the dispensing apparatus of the invention;

Figure 2 is a vertical central section through one of said units, showing the coin control mechanism in normal position, i. e., initial position;

Figure 3 is a horizontal section on the line 3—3 of Figure 2;

Figure 4 is a section corresponding to Figure 2 on an enlarged scale, showing the vacuum jacketed receptacle removed from the stand and inverted ready for filling, the figure is broken away intermediately of the vertical dimension and thus shortened for convenience of illustration, and the parts are slightly separated for convenience of illustration;

Figure 5 is a horizontal section on the line 5—5 of Figure 2, showing the stop member of the feed, the outer portion of the jacket and so forth being removed for convenience of illustration;

Figure 6:
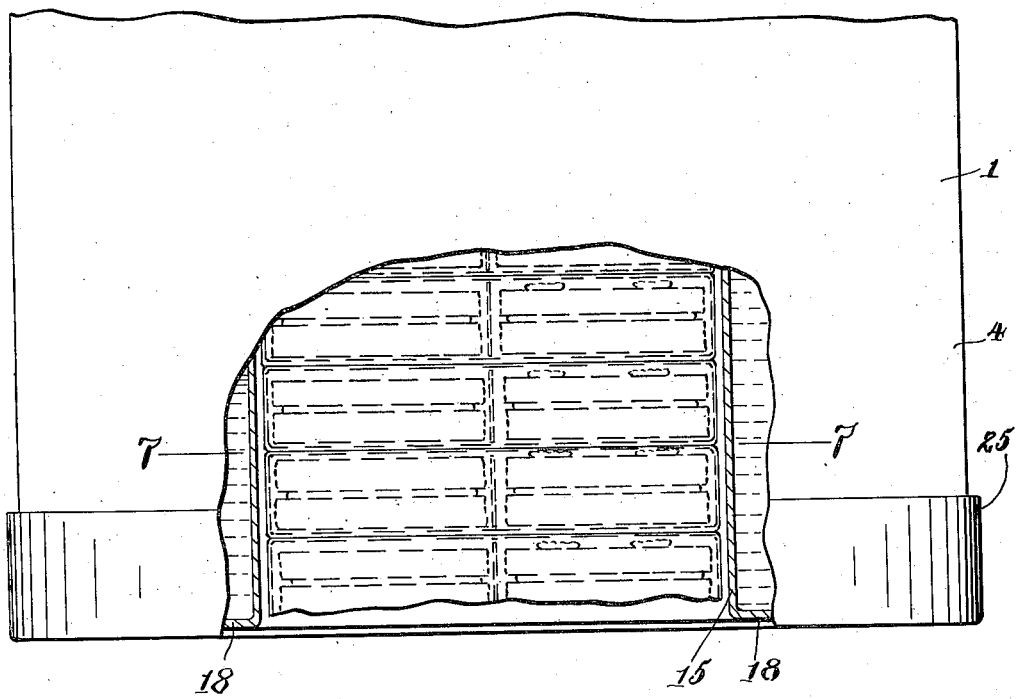
Figure 7:
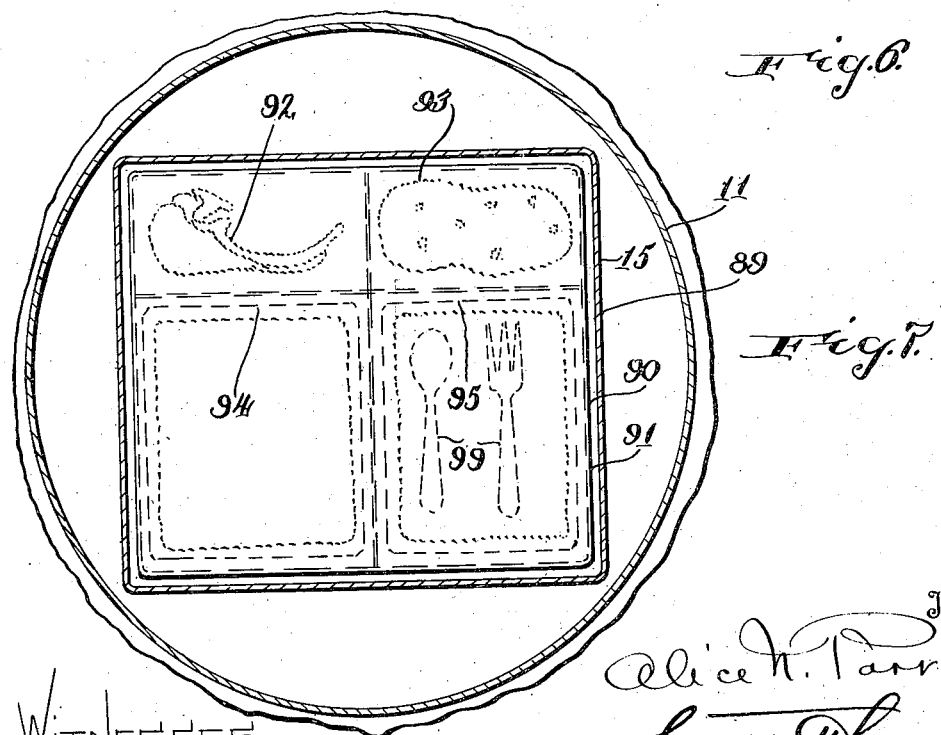

Figure 6 is an elevation broken away to show the inner chamber including the food packages in slightly modified form in section, the apparatus being in the upright position in which it is shown in Figure 2 and fully assembled but removed from the stand, the upper part of this case is broken away for convenience of illustration;

Figure 7 is a horizontal section on the line 7—7 of Figure 6, showing a food package in detail, the figure being on a slightly enlarged scale as compared to Figure 6;

Figure 8 is a fragmentary sectional plan view on an enlarged scale, taken on the line 8—8 of Figure 2, showing the coin controlled and coin handling mechanism in full lines in mid-operating position, certain parts being shown in dotted line in normal position.

Figure 9 is a section in the line 9—9 of Figure 8, looking to the right;

Figure 10 is a fragmentary sectional elevation of the coin control mechanism shown in Figure 8.

Referring to the drawings by numerals, each of which is used to indicate the same or similar parts in the different figures, the apparatus as shown comprises one or more insulated dispensing units 1, which may be supported on a display stand or rack 2 shown as provided with a shelter 3, the dispensing units 1 being locked to the display stand in a manner to be described to prevent their removal by unauthorized persons.

The dispensing units 1 consist each of an insulated container 4 for the packages 5 to be dispensed and a suitable locking and a delivery base 6 forming part of the stand 2, there being one base for each unit in which base is housed a suitable delivery mechanism 7 for each unit which in the preferred form of the invention illustrated and preferably is coin controlled in a manner to be described.

More particularly the container 4 for each unit in the preferred form is vertically elongated and open at one end, the open end being turned downwardly in the dispensing position of the apparatus. This container 4 in the form illustrated consists of an outer container 4' enclosing an inner container 15. The outer container 4' has an outer casing 10 within which is enclosed a vacuum jacket 11 or an equivalent insulating jacket 11, shown as spaced inwardly from the outer casing, providing an additonal insulating jacket 12. This jacket 12 as shown is filled with insulating material 14 which in the form of the invention shown is felt, asbestos, cork or other suitable material, though any preferred type of insulating jacket may be used. This outer jacket protects the vacuum jacket from physical shocks and reduces the transfer of heat to and from the outside atmosphere.

Within the vacuum jacket 11 and preferably spaced inwardly therefrom is an inner container or receptacle 15 for the packages or material to be dispensed, the inward spacing of the container or receptacle 15 providing an annular or other conveniently shaped chamber 16 for heating or cooling fluid surrounding the inner receptacle 15 and forming a heating or cooling reservoir to maintain the temperature of the commodity being sold above or below atmospheric temperature as may be desired, depending on the nature of the commodity and in some instances the temperature of the air.

As already stated, each container 4 is in the vending position of the apparatus, supported on a suitable base 6, which forms a part of the vending unit 1, and in this position of the apparatus, the opening or mouth of the container is turned downwardly. To meet this condition the chamber 16 for heating or cooling fluid must be sealed as to its open end at 17, which is turned downwardly in Figure 2, as shown. To this end the inner container 15 for the commodity being sold is in the preferred form shown provided at its open end with a wide outwardly projecting peripheral flange 18 which in this position underlies and contacts a wide packing washer or gasket 19 which in turn contacts on its opposite side the peripheral flat surface 20 of the outer container 4'.

In the form of the invention shown the stand 2 is provided with a horizontal support or table 21 for the dispensing units which table is formed with a socket or depression 22 in the top of the base 6 of each dispensing unit in which socket or depression the dispensing containers 4 are locked in dispensing position.

The details now being referred to are more fully illustrated in Figure 4. In this figure it will be noted that the outer casing 10 is formed with a threaded area 24 on the outer surface near the edge which is uppermost in the filling position and at the bottom in the operating position of the apparatus. This threaded portion receives and engages an internally threaded collar 25 which is preferably of L-shaped cross section, i. e., having an inwardly projecting flange 26. This collar is in closing the apparatus screwed down on to the top of the outer casing 4' when the chamber 16 has been suitably filled with heating or cooling material which would ordinarily be liquid to hold the parts in their fluid tight closed relation.

These parts are shown in open position in Figure 4 from which position to close the apparatus the washer or gasket 19 is moved downwardly into contact with the edge 20 of the outer container 4', the inner container 15 is then moved downwardly until its flange 18 rests on the gasket 19 after which the collar 25 is screwed down, bringing the flange 26 on the collar into snug contact with the flange 18 of the inner container 15 pressing it against gasket 19 and the latter against top surface 20 of the outer container 4', holding the parts in their fluid tight relation already described.

The inner receptacle 15 may be filled with the food or other packages to be dispensed which are kept in the acceptable hot or cold condition by a heating or cooling medium, ordinarily water, or brine, in the chamber 16 surrounding the inner container. The complete container 4 including outer container 4' and inner container 15 thus assembled, is then inverted and placed in position in the corresponding socket 22 in the table 21, or otherwise suitably supported, and the collar 25 presenting in this position an upwardly disposed shoulder 27, a locking collar 28 encircling the outer container is moved downwardly against the shoulder 27 which it engages with the inner peripheral area of its bottom surface. The collar is then locked to the table in any suitable manner, as by means of a staple 29 projecting upwardly from the table and extending through a slot 30 in the flange 31 of the collar 28, which staple is shown as engaged by a padlock 32 holding the container in dispensing relation to the base 6 and the delivery mechanism 7 to be described.

The packages 5, or other contents of the inner receptacle 15 rest in the operative position of the dispensing unit on the upper member or disc 33 of a valve or shutter member 34 which may be in any convenient form, but which in the preferred form is a double valve comprising the upper member 33 and the lower valve member 35. The upper valve member 33 rests on a downwardly exposed seat 36 surrounding the opening 37 in the base 6 in which the lower package 5 next to be delivered is supported, and the lower valve member 35 rests on an upwardly disposed seat 38 encircling the delivery opening 39.

The pressure of the valve members 33 and 35 against their respective seats 36 and 37 results in the form of the invention shown from two helical springs 41 which are compressed between the valve members, pressing one upwardly and the other downwardly, the springs being in the form of the invention shown positioned by central studs 42.

The opening 37 formed in the base 6 in which the lower package about to be delivered is located to provide protection of the package against the outside temperature, is surrounded by a thick layer or ring of insulation 43, and the opening 37 is further enclosed by a lining or sleeve 44 which is preferably of conducting material as aluminum or the like, some high conducting alloy being regarded as a desirable material, whereby the temperature of the inner container 15 is communicated downwardly to the lower opening or chamber 37 whereby it is transmitted to and maintained in the lower package 5' or in any material being vended, which is located in the delivery position. In this way any tendency to an undesired change of temperature on the part of the package about to be delivered is avoided.

As a means for further contributing to this end, the upper valve member 33 may be formed of insulating material or more specifically as shown it may consist of an outer casing 45 enclosing a body of insulating material 46, and the lower valve member 35 may be similarly constructed. The valve member may to advantage be further provided with a central top disk 40 of aluminum contacting the bottom edges of the lining 44 and receiving heat therefrom. The package 5 may also be formed with a raised bottom spacing the contents above the valve.

In the form of the invention shown, the valve members 33 and 35 are connected together to be simultaneously operated by means of links 47 pivotally connected at 48 and 49 to the respective valve members and likewise pivotally connected to each other and to a sliding bar 51 by means of a pin 50. The sliding bar 51 is drawn to the left in Figure 2, i. e., given a tendency to return and remain in the closed position to the valve, by means of a spring 52 connected to the frame of the machine in any suitable manner at 53. The sliding bar 51, see particularly Figure 10, showing an enlarged view of the mechanism, terminates within the casing 52', the end of the bar 51 being formed with an upwardly disposed shoulder or abutment 53'. Over this abutment very slightly to the left of the abutment is a coin slot 54 formed in casing 52' and extending to the right from this position is an operating member 55 which operating member while it extends to the right, also overlies and overlaps the abutment 53 to the left in the initial position in which it is shown. The overlapping end of this operating member 55 which overlies the abutment 53' is provided with a coin slot 57 which coin slot is of downwardly reducing cross section, particularly as to the upper part of the slot forming a funnel-like portion 58 directly beneath the coin slot 54 in the casing.

The operating member 55 as aforesaid extends to the right from the slot and is provided with a handle 59 projecting outwardly to the right from the wall 60 of the casing through which the member 55 extends, as best illustrated in Figures 2, 8 and 10. This operating member as shown and preferably, consists of two members, i. e., the handle member 61 at the right and the coin carrying member 62 at the left, the two members being pivotally connected at 63. The handle member 61 may be provided with a guide opening 64 in the casing, see Figure 2, so that it normally reciprocates in line with the sliding bar 51 and it is drawn to the left toward the position in which it is shown in Figure 2 by a spring 71, the handle member being accurately located in normal position by a stop 64'.

The coin carrying member 62 is provided with the inclined cam follower surface 65 which engages cooperating cam surface 66 of a stationary cam 67, and the two members 61 and 62 are provided with aligned opposed spring supports 68 between which is a helical compression spring 69 which tends to swing the coin carrying member 62 to the left in Figure 8, holding the cam follower surface 65 in contact with the cam surface 66. Beneath the carrier 62 and slightly to the right of the coin slot is shown a coin box 70 within the casing which box has its top edge spaced beneath the level of the sliding bar 51 as best shown in Figure 2 and 10, and this coin box as shown is provided with a shelf 71' projecting beneath the coin slot.

In the feeding operation it will be understood that the first or lower package 5' is released when the valve members are removed from the closed position as hereinafter described, and to check the advance of the second package 5'' in line to be next delivered and to prevent the passage of the same downwardly in connection with the first package, any suitable stop member 72 is provided. This stop member in the form of the invention shown comprises an arcuate contact member 73 seated in a suitable aperture in the wall of the delivery opening or passage 37, which contact member is supported on a thrust rod 74. The contact member is moved and held normally out of contact with the package by spring 75 encircling the rod 74 and bearing at one end against a pin 76 extending through the rod and at the other end against an abutment 77 in the base surrounding the opening 78 therein, in which the rod 74 slides. The sliding rod 74 is in turn actuated by a lever 79 intermediately pivoted at 80 and having an upwardly projecting end 81 engaging the end of the sliding rod 74 and a downwardly projecting end carrying a roller or other contact member 82, which roller or contact member 82 is engaged by the upper valve member 33 as it moves rearwardly to open position, swinging the upper end 81 of the lever 79 to the left in Figure 2, thereby advancing the rod 74 in the same direction and pressing the contact member 73 into close contact with the second package 5'' and holding the same in its position, as illustrated until the lower package 5' has been dropped, and the valve 33 returned to closed position, in which position the contact member or follower 82 which has been swung to the right by contact with the top surface of the valve member will be released, permitting the contact member 73 to be drawn to the right by the spring 75 releasing the second package 5'' and permitting it to drop to the position now occupied by the lower package 5', which motion will, of course, be followed by a corresponding motion on the part of the remainder of the packages.

In the operation of the valve members 33 and 34 and the coin controlled apparatus shown in connection therewith, a proper coin 84, Figures 8, 9 and 10, fitting the slot 54 in the casing and the slot 57 in the operating member being introduced through the slot 54 passes downward by gravity through the funnel portion 58 and comes to rest in the slot 57 with its lower peripheral point bearing against the top edge 85 of the sliding bar 51, it being understood that this sliding bar is preferably tapered upwardly at 86 from the full cross section to the reduced edge 85 for convenience in dropping the coin, as hereinafter described.

In the position just described, and particularly illustrated in Figures 8, 9 and 10, the coin 84 being seated in the slot 57 rests on the sliding bar 51 immediately in line with and to the left of the shoulder 53' which shoulder is disposed toward the left in Figures 2, 8 and 10, i. e., toward the valve 34. As thus located it serves as a temporary connection between the sliding bar 51 and the operating member 55, so that when the purchaser having deposited the proper coin applies operating force to the handle 59, the handle being pulled outwardly, i. e., to the right in Figures 2, 8 and 10, the connection thus established between the operating member 55 and the sliding bar 51 transmits the operating force from the handle to the sliding bar 51, and hence, to the valve 34, moving the same to the right against the tension of the springs 52 and 71, whereby the lower package 5' is released and dropped through opening 37 into the delivery passage 39, from which it is removed by the purchaser.

As the valve 34, particularly the upper valve member 33, moves to the right releasing the lower package 51 it contacts the follower 82 of the stop mechanism swinging the stop lever 79 in left handed rotation about the center 80 advancing the contact member 72 into contact with the second package 5'', holding the same in position until the valve is again closed, it being understood that the riding of the follower 82 on the upper surface of the valve member 33 gives the desired advance of the contact member 82 sufficient to hold the package.

The motion of the handle 59 to the right as it moves the valve 34, uncovering the opening 37 also serves to bring the follower surface 65 of the coin carrier 62 into contact with the cam surface 66 of the stationary cam 67 and the continued motion of the parts to the right serves to swing the coin carrier by the cam action in right handed rotation about its pivot pin 63, whereby the coin slot 57 and the coin 84 carried thereby are swung out of line with the shoulder 53 of the sliding rod, 51, the parts being timed to release the sliding bar 51 in this way. After the opening 37 has been completely uncovered and the package dropped when the sliding bar is thus released, the valve member 34, including the upper and lower members 33 and 35, and the sliding bar, are returned by the spring 52 to the normal closed operative position shown in Figure 2.

The swinging motion of the coin carrier 62 resulting from the action of the cam and the motion of the handle to the right serves to pass the coin over the shelf 71 which serves to support it in the slot 57 during its traverse to a position over the box 70 into which it is dropped from the slot 57 when the shelf and the adjacent wall of the box are passed, it being understood that the coin has also moved out of contact with shoulder 53'. The handle 59 reaches the end of its stroke as determined by contact of a stop 70' with a suitable stop surface 70'' on the casing. At the same time the coin carrier is returned by the spring 69 to its normal position shown in particular in Figure 8.

The valve 34 having been released and returned by the spring 52 to the normal closed position shown in Figure 2, the arm 79 is in turn released by the passing of the upper valve member 33 to the left out of contact with the follower 82 and the contact member 72 is withdrawn by the spring 75 releasing the package 5'' and permitting it to drop to the delivery position previously occupied by the package 5', the remainder of the packages in the inner container 15 moving downwardly accordingly. The delivery operation thus described is repeated for each coin deposited and each corresponding operative motion of the handle 59 until the packages 5 or other contents of the container 15 are exhausted.

It is then necessary to refill the apparatus. This in accordance with the preferred form shown is accomplished by removing the lock 32, see Figure 2, which permits the entire unit with the locking ring 28 to be removed from the stand. To prevent rotation of the casing and its removal by unauthorized persons it may be provided with ribs 28' fitting in corresponding grooves in the collar 28.

When the container is thus removed, it is inverted relatively to the position which it occupies in Figure 2, which brings the opening upward and the collar 25 is unscrewed and removed, releasing the inner container 15, so that it may be removed or raised, permitting the heating or cooling medium 16 to be changed. The inner receptacle thus rendered accessible having been refilled with a salable commodity which is to be kept hot or cold in accordance with the requirements for the particular commodity determining the temperature of the heating or cooling medium, the container 1 is reassembled, the collar 25 replaced and the unit is reinstalled in the rack and lock, being thus made ready for a new series of vending operations.

In Figures 6 and 7 a slightly modified form of container is shown, the inner container 89 being as illustrated of square cross section and the views disclose an improved lunch package 90. This package 90 as shown in enclosed in a container 91 which is rectangular in plan and divided into sections, shown as containing a serving of meat at 92, a potatoe at 93, a slice of bread or sandwich at 94 and a second piece of bread or sandwich at 95. This compartment may also enclose a spoon and fork 99, or other tableware.

I have thus described specifically and in detail an apparatus and the method of operating the same, whereby a hot lunch package or serving of coffee or a cold package as ice cream or milk, is placed in the apparatus and delivered in the desired temperature automatically without the necessity for attendants, other than the replenishing of the commodities and the heating and cooling medium, the description is specific and in detail in order that the nature and operation of the device may be understood, however, the specific terms herein are used descriptively rather than in a limiting sense, the scope of the invention being found in the claims.

What I claim as new and desire to secure by Letters Patent is:

1. An automatic dispensing apparatus having an outer insulated casing, an inner chamber for the commodity being sold and an intermediate chamber for heating or cooling medium and means for delivering the commodity in predetermined units, said casing and chambers being removable for filling and permanently closed at one end and cooperating with said delivery means at the other end.

2. An automatic dispensing apparatus comprising an outer insulated casing, a removable inner container for the commodity being sold, the inner container being spaced inwardly from the outer casing, providing a chamber for heating or cooling medium and a base on which the said container is supported in inverted position, means for fastening the container to the base and delivery means in the base cooperating with the inverted container.

3. An automatic dispensing apparatus comprising an outer insulated casing open at one end, a removable inner container to fit inside the outer casing and spaced inwardly therefrom, providing an intermediate chamber for heating or cooling medium, the inner container being open at the end adjacent the opening in the outer casing, means for closing the opening in the outer casing around the inner container, a support having a base cooperating with said outer casing and inner container to support the same in inverted position and means for closing and opening the inner container to provide for the delivery of the contents thereof in predetermined units.

4. An automatic dispensing apparatus comprising an outer insulated casing open at one end, a removable inner container to fit inside the outer casing and spaced inwardly therefrom, providing an intermediate chamber for heating or cooling medium, the inner container being open at the end adjacent the opening in the outer casing, means integral with the inner container for closing the opening in the outer casing around the inner casing, a support having a base cooperating with said outer and inner container to support the same in inverted position and means for closing and opening the inner container to provide for the delivery of the contents thereof in predetermined units.

5. The combination in a food dispensing apparatus of an external elongated insulated casing open at one end, an inner container fitting therein and having an opening adjacent the opening in the outer casing, a chamber for heating means surrounding the casing within the outer container, a base for the container and means for securing it thereto and means for closing the opening in the container and means controlling the same comprising delivery means in the base for releasing the commodity in the inner container in predetermined units, said casing, and container being removable for filling and permanently closed at the end opposite said delivery means.

6. The combination in a food dispensing apparatus of an external elongated insulated casing open at one end, an inner container fitting therein and having an opening adjacent the opening in the outer casing, a chamber for a heat vehicle surrounding the casing within the outer container, a support for the container and casing and means for securing them thereto, delivery means in the base for releasing the commodity in the inner container, said base having a delivery opening, insulating members surrounding the opening, a valve closing the opening and stop mechanism for limiting the delivery of the commodity to a predetermined unit.

7. A food vending apparatus having an outer vacuum insulated removable casing with a downwardly disposed opening, a removable inner container within said casing likewise having a downwardly disposed opening, said casing and container being arranged to form an enclosure for a heat vehicle between the inner container and outer casing providing for controlling the temperature of the inner container, delivery means controlling the opening of the inner container and a support to which said casing and chambers are removably secured in inverted position, the ends of said casing and the chamber opposite to said support being permanently closed.

8. A food dispensing apparatus having a removable outer insulated casing with a downwardly disposed opening, a removable inner chamber within said casing likewise having a downwardly disposed opening, said chamber and casing being spaced apart to provide a chamber for a heat vehicle between the inner chamber and outer casing for controlling the temperature of the inner chamber, a base supporting said casing and having an opening registering with the opening in the inner chamber, and a vending valve controlling the opening, said outer casing and chamber portion being removably secured to said support and permanently closed at the ends opposite to said opening and vending valve.

9. A food dispensing apparatus having an outer insulated casing with a downwardly disposed opening, an inner container within said casing likewise having a downwardly disposed opening, a chamber for a heat vehicle between the inner container and outer casing for controlling the temperature of the inner container, means integral with the inner container for closing the chamber, a base supporting said container and casing and having an opening registering with the opening in the container, insulating means surrounding the opening and a vending valve controlling the opening.

10. A dispensing apparatus having an outer insulated casing with a downwardly disposed opening, an inner container within said casing likewise having a downwardly disposed opening, a chamber between the inner and outer casing for a heat vehicle, controlling the temperature of the inner container, a base supporting the inner container and outer casing and having an opening for releasing the commodity from the inner container, a valve casing connected to the base, a vending valve therein comprising upper and lower members, a delivery opening below the valve, valve seats surrounding the base opening and the delivery opening, means pressing the valve members against the respective openings, a stop means for limiting the delivery of the commodity being released to a predetermined unit at each motion of the valve and means for operating the valve.

11. In a food dispensing apparatus, an outer insulated casing, an inner container spaced inwardly therefrom providing a chamber for a heat vehicle, both the container and the casing having openings which are downwardly disposed in the dispensing position, the inner container being removable for filling and having an outwardly extending flange for closing the chamber, a supporting base, a closing ring engaging the outer casing and applying closing pressure to the flange to hold the inner container in position, a collar encircling the casing and bearing on the ring and means for locking the collar to the base.

Signed by me at Baltimore, Maryland, this 16th day of November, 1928.

ALICE N. PARRAN.